US010272731B2

United States Patent
Pniewski et al.

(10) Patent No.: US 10,272,731 B2
(45) Date of Patent: Apr. 30, 2019

(54) RESERVOIR FOR AIRSPRING APPLICATIONS

(71) Applicant: Continental Automotive Systems, Inc., Auburn Hills, MI (US)

(72) Inventors: Garrett Mark Pniewski, Bloomfield Hills, MI (US); Kranti Kiran Manga, Rochester Hills, MI (US); Sunny Makkar, Troy, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 0 days.

(21) Appl. No.: 15/293,328

(22) Filed: Oct. 14, 2016

(65) Prior Publication Data

US 2018/0105006 A1    Apr. 19, 2018

(51) Int. Cl.
*F16F 9/43*    (2006.01)
*B60G 15/12*    (2006.01)
(Continued)

(52) U.S. Cl.
CPC .............. *B60G 15/12* (2013.01); *B60G 11/27* (2013.01); *B60G 11/30* (2013.01); *B60G 17/0416* (2013.01); *B60G 17/0521* (2013.01); *F16F 9/08* (2013.01); *F16F 9/082* (2013.01); *F16F 9/3214* (2013.01); *B60G 2202/314* (2013.01)

(58) Field of Classification Search
CPC .... F16F 9/0472; F16F 9/43; F16F 9/05; F16F 9/0436; F16F 9/049; B60G 11/26; B60G 11/27; B60G 11/30; B60G 15/12; B60G 2202/314
See application file for complete search history.

(56) References Cited

U.S. PATENT DOCUMENTS 2,208,537 A    7/1940    Brown
5,632,471 A    5/1997    Pradel
(Continued)

FOREIGN PATENT DOCUMENTS

DE    10348580 A1 *    5/2005    ............. B60G 11/27
DE    102006031484 A1 *    2/2007    ............. B60G 15/14
(Continued)

OTHER PUBLICATIONS

Machine translation of EP 1764241 (no date).*
(Continued)

*Primary Examiner* — Nicholas J Lane

(57) ABSTRACT

An air spring assembly for a vehicle having a reservoir which is adaptable to meet different packaging requirements. The air spring assembly includes a damper body, at least one piston connected to the damper body, and a bellow connected to the piston, the bellow having a cavity. A top cap is connected to the bellow, and a fitting is connected to the top cap. A reservoir is connected to the fitting such that the reservoir is in fluid communication with the cavity. Air flows between the bellow and the reservoir as a result of movement of the piston and damper body during travel of the vehicle. The reservoir may be tube-shaped, having a consistent diameter, or a varying diameter. The reservoir may also be spherical-shaped, rectangular-shaped, square-shaped, or may be shaped to fit specific packaging requirements such that the reservoir may be positioned in any area of the vehicle.

9 Claims, 3 Drawing Sheets

(51) Int. Cl.
*F16F 9/08* (2006.01)
*F16F 9/32* (2006.01)
*B60G 11/27* (2006.01)
*B60G 11/30* (2006.01)
*B60G 17/04* (2006.01)
*B60G 17/052* (2006.01)

(56) References Cited

U.S. PATENT DOCUMENTS

| | | | |
|---|---|---|---|
| 6,343,781 B1 * | 2/2002 | Joseph | B60G 11/27 267/64.11 |
| 7,690,666 B2 | 4/2010 | McAndrews | |
| 2001/0045693 A1 * | 11/2001 | Job | F16F 9/05 267/64.11 |
| 2003/0067103 A1 * | 4/2003 | Easter | B60G 17/0528 267/64.28 |
| 2004/0032065 A1 * | 2/2004 | Leonard | B60G 17/0521 267/122 |
| 2005/0093265 A1 | 5/2005 | Niaura et al. | |
| 2014/0054122 A1 | 2/2014 | Coaplen | |
| 2015/0273968 A1 * | 10/2015 | DeBruler | F16F 13/002 267/64.24 |
| 2016/0108986 A1 * | 4/2016 | Leonard | F16F 9/38 248/565 |
| 2016/0236532 A1 * | 8/2016 | Moulik | F16F 9/05 |

FOREIGN PATENT DOCUMENTS

| | | | | |
|---|---|---|---|---|
| EP | 1464866 A2 * | 10/2004 | | B60G 17/0416 |
| EP | 1659007 A2 * | 5/2006 | | B60G 15/12 |
| EP | 1764241 A1 * | 3/2007 | | B60G 11/27 |
| GB | 1068167 A * | 5/1967 | | F16F 9/049 |
| JP | 2000001113 A * | 1/2000 | | B60G 11/30 |

OTHER PUBLICATIONS

English language abstract for DE 102006031484 (no date).*
English language abstract for DE 10348580 (no date).*
English language abstract for EP 1659007 (no date).*
English language abstract for JP 2000001113 (no date).*
International Search Report and the Written Opinion of the International Searching Authority dated Jan. 17, 2018 for corresponding PCT application No. PCT/US2017/056514.*

* cited by examiner

US 10,272,731 B2

RESERVOIR FOR AIRSPRING APPLICATIONS

FIELD OF THE INVENTION

The invention relates generally to an air spring reservoir which provides an additional or switchable volume for an air spring, where the reservoir may be mounted in different locations.

BACKGROUND OF THE INVENTION

Suspension systems for automotive vehicles provide vehicle passengers with a more comfortable ride. Air suspension systems utilize air springs, rather than traditional coil springs. Air suspension systems provide different suspension qualities that may be preferable in some vehicles to traditional coil spring suspensions.

A conventional aft spring is a device that is arranged between a vehicle body and chassis. The typical air spring has at least one working space, or cavity that is filled with compressed air. Air spring pistons typically seal the aft chamber against a hydraulic shock absorber (damper). Many air spring systems also include a reservoir which provides a greater volume of working space to supplement the cavity filled with compressed air. The addition of a reservoir provides an additional air cavity for packaging more air volume in the vehicle environment available for use with the air spring.

However, the reservoir occupies space, and various packaging requirements may require the reservoir to be placed in a remote location relative to the rest of the air spring components, or the reservoir may be limited in size.

Accordingly, there exists a need for a reservoir which is adaptable to various vehicle packaging requirements, and may be located in close proximity to the other air spring components.

SUMMARY OF THE INVENTION

The present invention is an air spring assembly for a vehicle having a reservoir which is adaptable to meet different packaging requirements. The air spring assembly includes a damper body, at least one piston connected to the damper body, and a bellow connected to the piston, where the bellow has a cavity. A top cap is connected to the bellow, and a fitting is connected to the top cap. A reservoir is connected to the fitting such that the reservoir is in fluid communication with the cavity. The compression of air in the combined volume of the bellow and the reservoir is a result of movement of the piston and damper body during travel of the vehicle.

In one embodiment, the reservoir is tube-shaped, and has a consistent diameter, or the reservoir may have a varying diameter. In yet other embodiments, the reservoir may also be spherical-shaped, rectangular-shaped, square-shaped, or may be shaped to fit specific packaging requirements such that the reservoir may be positioned in any area of the vehicle. In one embodiment, the reservoir surrounds the entire air spring assembly. The reservoir may have a coil-shape and surround the air spring assembly in a helical manner.

In an embodiment, the air spring assembly includes a valve which is opened and closed for selectively providing fluid communication between the cavity and the reservoir to change the volume of air used by the air spring assembly during operation.

In an embodiment, a guide tube is connected to the top cap, and at least a portion of the reservoir surrounds the guide tube. The top cap is connected to a frame portion, where the frame portion is part of the frame of the vehicle. In one embodiment, the reservoir is attached to the frame portion, and in other embodiments, a portion of the reservoir extends through the frame portion. In yet another embodiment, a portion of the reservoir extends into an engine compartment, or another area of the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
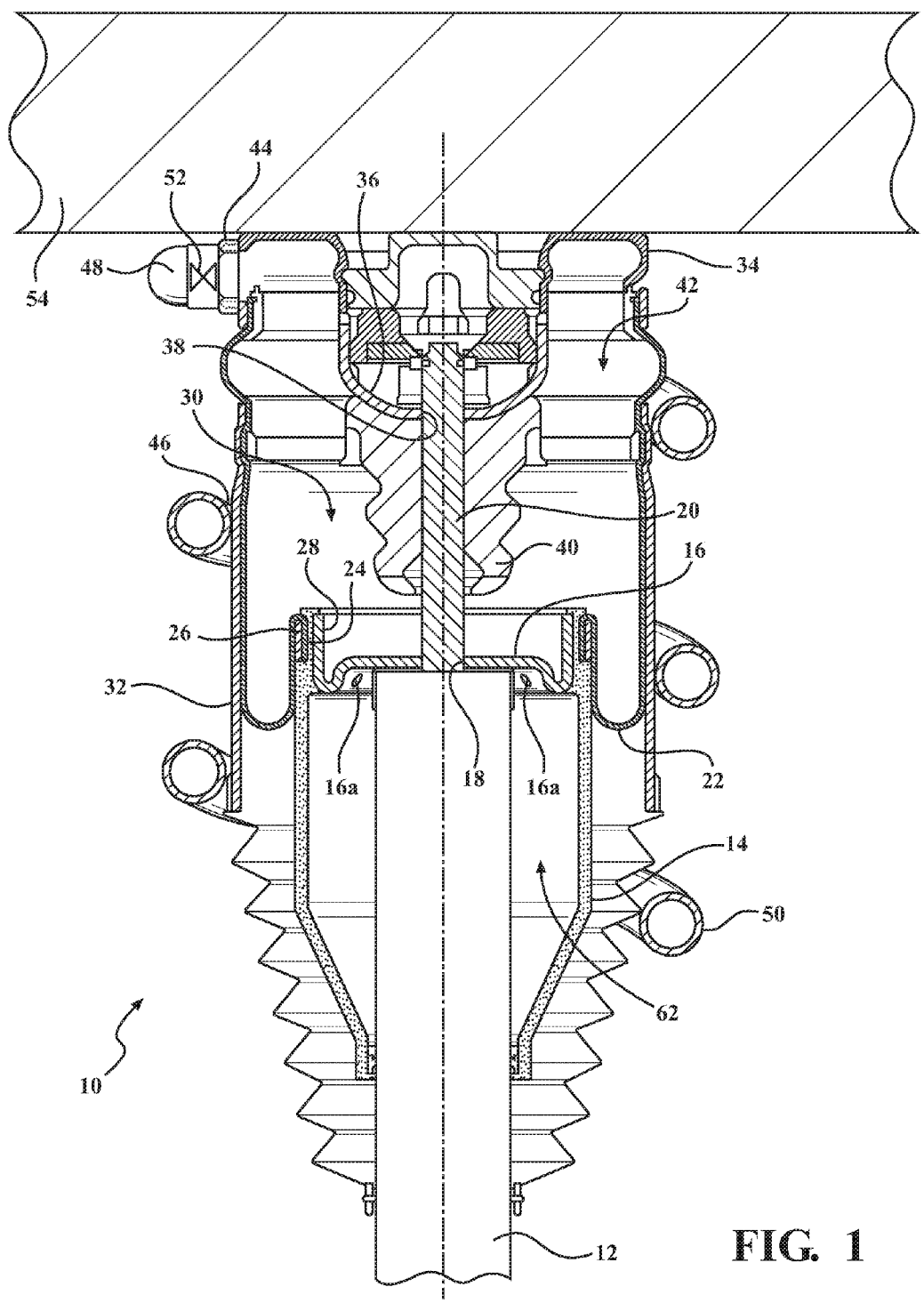
FIG. 1 is a sectional view of a first embodiment of an air spring assembly, according to embodiments of the present invention.

An air spring for a vehicle, where the air spring has a reservoir according to the present invention is shown in FIG. 1, generally at 10. The air spring 10 includes a damper body 12, and surrounding a portion of the damper body 12 is an outer piston 14. The outer piston 14 is connected to an inner piston 16, which is connected to the damper body 12 as shown. The inner piston 16 includes an aperture 18, and extending through the aperture 18 is a damper rod 20. The air spring 10 also includes a bellow 22, which is flexible and able to change shape as the pistons 14,16 are moved relative to the damper rod 20. A free end 24 of the bellow 22 is clamped between a clamping ring 26 and a portion of the outer piston 14, and is adjacent a flange portion 28 of the inner piston 16.

The bellow 22 includes a cavity, shown generally at 30, which is generally filled with air. The cavity 30 of the bellow 22 is in fluid communication with a cavity, shown generally at 62, formed as part of the outer piston 14. The cavity 30 is in fluid communication with the cavity 62 through several apertures 16a formed as part of the inner piston 16. The bellow 22 is partially surrounded by a guide tube 32, and the guide tube 32 and the bellow 22 are connected to a top cap 34. The top cap 34 includes a base portion 36, and extending through an aperture 38 in the base portion 36 is the damper rod 20. The damper rod 20 also extends through a jounce bumper 40, which is partially surrounded by, and connected, to the top cap 34.

The top cap 34 also has a cavity, shown generally at 42, which is in fluid communication with the cavity 30 of the bellow 22 and the cavity 62 of the inner piston 14 such that the cavities 30,42,62 function as a single volume. Connected to the top cap 34 is a fitting 44, and the fitting 44 is connected to a reservoir 46. In the embodiment shown in FIG. 1, the reservoir 46 is tube-shaped, and surrounds the guide tube 32 in a helical manner, as shown in FIG. 1. In the embodiment shown in FIG. 1, the reservoir 46 has a first end 48 connected to the fitting 44, and a second end 50. The reservoir 46 is long enough to extend around the entire air spring assembly 10 twice, but it is within the scope of the invention that the reservoir 46 may be longer or shorter, depending upon the volume of air needed to allow the air spring 10 to function as desired. The reservoir 46 may also be configured to extend around specific components of the air spring assembly 10, such as the guide tube 32 shown in FIG. 1, the damper body 12, or some other component.

In an alternate embodiment, the air spring 10 optionally includes a valve 52, which in this embodiment is shown as part of the fitting 44, but it is within the scope of the invention that the valve 52 may be located in part of the top cap 34, or some other location as desired. The valve 52 is opened and closed to control the flow of air into and out of the reservoir 46, changing the size of the volume of air used as part of the air spring assembly 10, which changes the operation of the air spring assembly 10.

The top cap 34 is connected to another component of the vehicle, such as a frame portion 54, but it is within the scope of the invention that the top cap 34 may be connected to other components of the vehicle as well. Additionally, the damper body 12 is connected to another part of the suspension system of the vehicle, such as an A-arm, or swing arm.

Figure 2:
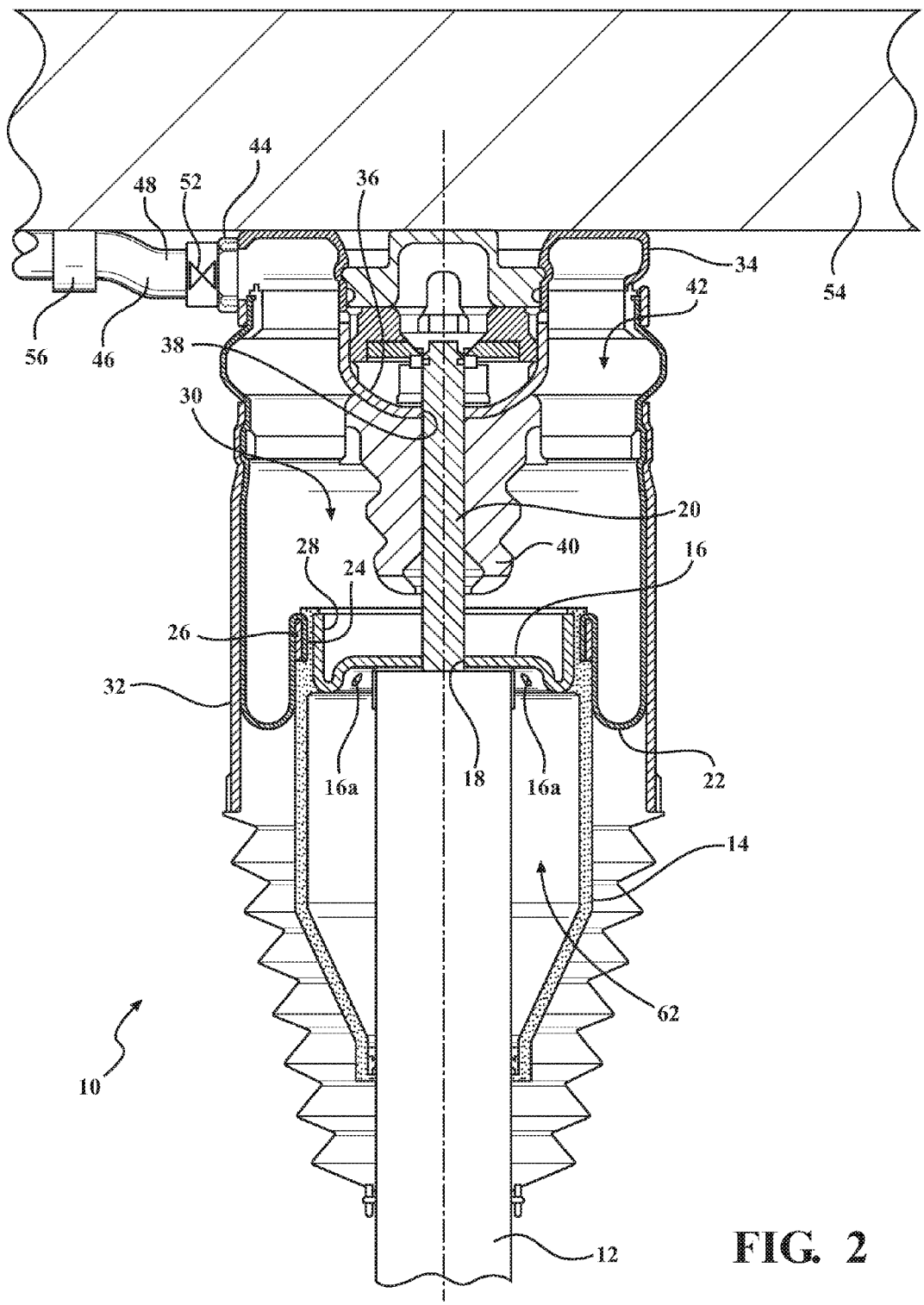
FIG. 2 is a sectional view of a second embodiment of an air spring assembly, according to embodiments of the present invention.

Another embodiment of the present invention is shown in FIG. 2, with like numbers referring to like elements. In this embodiment, the reservoir 46 is not wrapped around the guide tube 32, but rather is connected to the frame portion 54 using one or more clamps 56. The reservoir 46 in this embodiment may be of the same length as shown in FIG. 1, or the reservoir 46 may be longer or shorter, depending upon the volume of air desired. In this embodiment, the reservoir 46 is shown being connected to the bottom of the frame portion 54, but it is within the scope of the invention that the reservoir 46 may be connected to the frame portion 54 in any desirable manner, such as the side or the top of the frame portion 54, or the reservoir 46 may be wrapped around a portion of the frame portion 54. This embodiment may or may not also incorporate the use of the valve 52.

Figure 3:
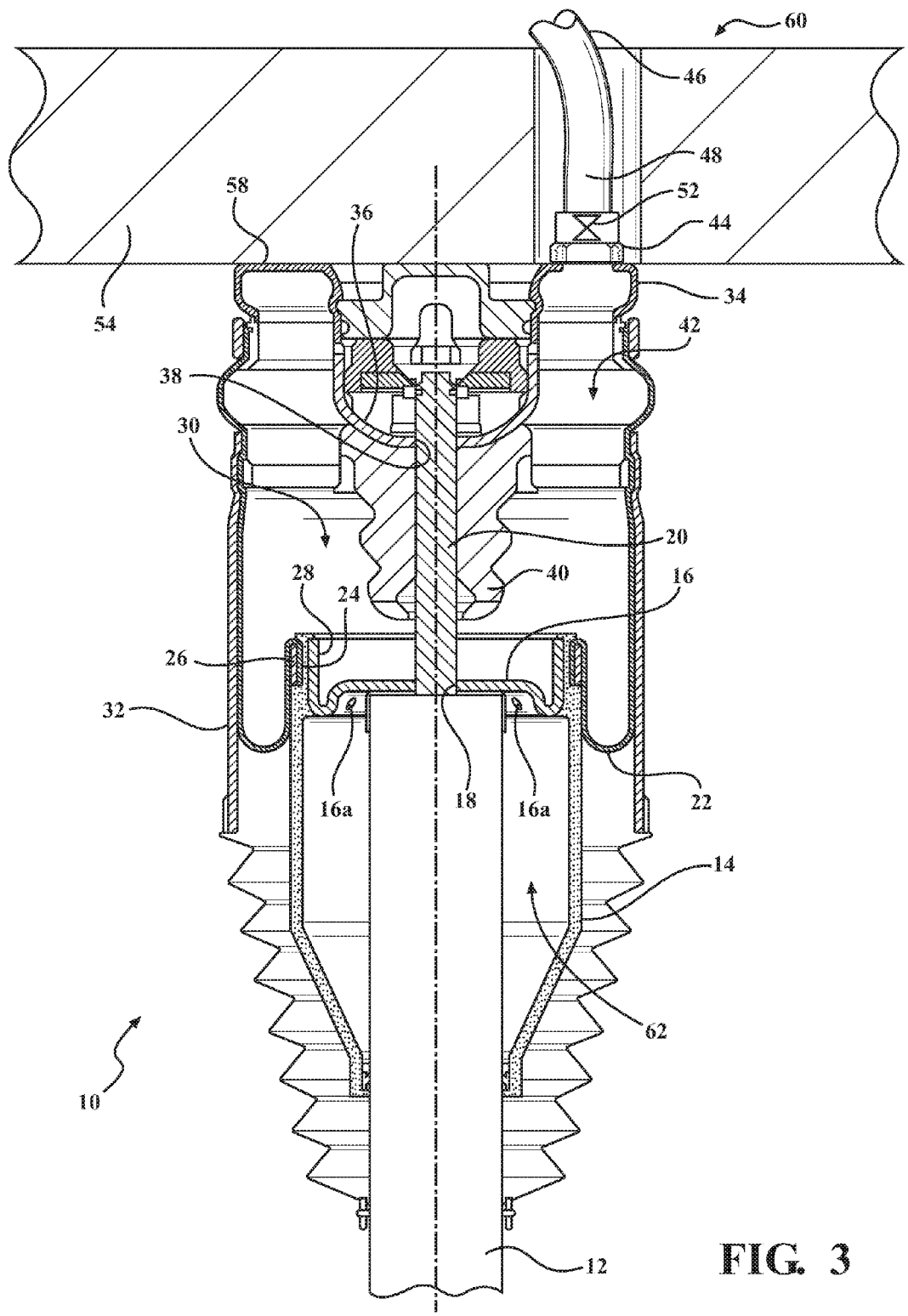
FIG. 3 is a sectional view of a third embodiment of an air spring assembly, according to embodiments of the present invention.

Another embodiment of the present invention is shown in FIG. 3, with like numbers referring to like elements. In this embodiment, the fitting 44 is mounted on a top surface 58 of the top cap 34. The fitting 44 may be adjacent the frame portion 54, or the fitting 44 may extend up into the frame portion 54. The reservoir 46 may also extend upwardly along the side of the frame portion 54, or in the embodiment where the fitting 44 extends up into the frame portion 54 as shown in FIG. 3, the reservoir 46 extends up through the frame portion 54 and into another area, shown generally at 60, of the vehicle. In one embodiment, the area 60 of the vehicle may be the engine compartment, but it is within the scope of the invention that the area 60 may be inside the body of the vehicle, inside the fire wall, along the wheel well, or the area 60 may be any other part of the vehicle which optimizes the packaging requirements for the reservoir 46.

In the embodiments shown, the reservoir 46 is tube-shaped, but it is within the scope of the invention that the reservoir 46 may be of other shapes as well. The reservoir 46 may be tube-shaped having a consistent diameter shown in the Figures, or the reservoir 46 may have a varying diameter. The reservoir 46 may also be spherical-shaped, rectangular-shaped, square-shaped, or may be shaped to fit specific packaging requirements such that the reservoir 46 may be positioned in any area of the vehicle.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. A apparatus comprising:
an air spring assembly, including;
a damper body;
at least one piston connected to the damper body;
a bellow connected to the at least one piston;
a cavity disposed inside the bellow;
a top cap connected to the bellow;
a fitting connected to the top cap; and
a reservoir external to the top cap and connected to the fitting, such that the reservoir is in fluid communication with the cavity;
a guide tube connected to the top cap; and
wherein the compression of air in the cavity of the bellow and the reservoir is a result of movement of the at least one piston and damper body and wherein at least a portion of the reservoir surrounds the guide tube.

2. The apparatus of claim 1, wherein at least a portion of the reservoir extends along the frame portion.

3. An air spring assembly, comprising: a damper body;
at least one piston connected to the damper body;
a bellow connected to the at least one piston;
a cavity disposed inside the bellow;
a top cap connected to the bellow;
a frame portion, the top cap connected to the frame portion;
a fitting connected to the top cap;
a guide tube connected to the top cap; and
a reservoir connected to the fitting and external to the top cap, such that the reservoir is in fluid communication with the cavity;
wherein the reservoir is located around the bellow, and air flows between the bellow and the reservoir as a result of movement of the piston and damper body and at least a portion of the reservoir surrounds the guide tube in a helical manner.

4. The air spring assembly of claim 3, further comprising a valve, wherein the valve is opened and closed for selectively providing fluid communication between the cavity and the reservoir.

5. The air spring assembly of claim 4, wherein the valve is disposed in the fitting.

6. The air spring assembly of claim 3, wherein at least a portion of the reservoir extends through the frame portion.

7. The air spring assembly of claim 3, wherein at least a portion of the reservoir extends into an engine compartment.

8. The air spring assembly of claim 3, wherein the reservoir is tube-shaped.

9. The air spring assembly of claim 3, wherein at least a portion of the reservoir is attached to the frame portion.

* * * * *